Patented Nov. 24, 1931

1,833,274

UNITED STATES PATENT OFFICE

HANNS BERNARD, OF UERDINGEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PAINT

No Drawing. Application filed August 27, 1928, Serial No. 302,435, and in Germany September 2, 1927.

The invention relates to improvements in coating compositions and more particularly to paints comprising a white pigment and yielding smooth coatings of high gloss.

A paint which is composed in the usual manner of a drying oil, with or without the addition of a thinner, and a white pigment, for example zinc oxide, has the tendency to dry to a dull film without gloss when the quantity of the covering pigment exceeds a certain upper limit. Besides, these paints applied to a smooth surface do not yield a smooth coating of uniform appearance but on drying show the strokes of brushing.

I have found that paint vehicles which may be incorporated with considerable amounts of a white pigment to form paints which dry to a glossy and smooth surface can be obtained by adding to the raw materials commonly used, unsaturated aliphatic carboxylic acids having less than 12 carbon atoms. In carrying out my invention I incorporate with the drying oil such as linseed oil and its transformation products, China wood oil or the like (in which small quantities of resins such as colophony or resin esters may be also present in the dissolved state) an unsaturated aliphatic carboxylic acid of the aforesaid kind which preferably may have a double linkage in the α- or β-position for example acrylic acid and its polymerization products, furfuryl acrylic acid, crotonic acid, hydrosorbic acid, angelic acid, sorbic acid or the like. A small addition—up to 5 percent—of these compounds is sufficient to produce paint vehicles which are excellently suitable for brushing and yielding coatings of high gloss even with large quantities of covering pigments.

The amount of pigments used, which need not be white pigments, may be considerably higher than customarily in the manufacture of paints without injuring the properties of the coating composition.

My invention is illustrated by the following examples but not restricted thereto. The parts are by weight.

Example 1

1000 parts of stand oil (iodine number 127; viscosity [at 100° C.] 15.5° [Engler]) are heated at 110 to 120° C. and mixed with 30 parts of crotonic acid which is readily dissolved by slight stirring. After cooling down 500 parts of zinc oxide are ground in 330 parts of the mixture in the customary manner to form a paste and mixed with 110 parts of a thinner (for example a mixture of 1 part turpentine and 9 parts of white spirit). By adding the usual amount of a drier, say, 2 parts of cobalt resinate dissolved in 8 parts of white spirit, a white paint is obtained drying to a smooth coating of high gloss.

Example 2

1000 parts of stand oil (iodine number 127; viscosity [at 100° C.] 15.5° [Engler]) are heated at 110 to 120° C. and mixed by stirring with 20 parts of sorbic acid. After cooling down 500 parts of zinc oxide and 330 parts of the mixture are ground to form a paste, mixed with 110 parts of a thinner (for example a mixture of 3 parts of turpentine and 7 parts of white spirit) and the usual amount of a drier. The paint thus prepared yields a smooth and glossy film.

I claim:

1. A drying oil paint composition containing an unsaturated aliphatic carboxylic acid having less than 12 carbon atoms and having a double linkage in the alhpa-position.

2. A drying oil paint composition containing crotonic acid.

3. A composition of matter comprising a drying oil, a thinner, a drier, a pigment and an unsaturated aliphatic carboxylic acid having less than 12 carbon atoms and having a double linkage in the alpha-position.

4. A composition of matter comprising a drying oil, a thinner, a drier, a white pigment and an unsaturated aliphatic carboxylic acid having less than 12 carbon atoms and having a double linkage in the alpha-position.

5. A composition of matter comprising a drying oil, a thinner, a drier, zinc oxide and an unsaturated aliphatic carboxylic acid having less than 12 carbon atoms and having a double linkage in the alpha-position.

6. A composition of matter comprising stand oil, a thinner, a drier, zinc oxide and crotonic acid.

7. A drying oil paint composition containing sorbic acid.

8. A composition of matter comprising stand oil, a thinner, a drier, zinc oxide and sorbic acid.

In testimony whereof I have hereunto set my hand.

HANNS BERNARD.